United States Patent
Degani et al.

(10) Patent No.: US 10,496,595 B2
(45) Date of Patent: Dec. 3, 2019

(54) METHOD FOR ZERO-COPY OBJECT SERIALIZATION AND DESERIALIZATION

(71) Applicant: Mellanox Technologies, Ltd., Yokneam (IL)

(72) Inventors: Yuval Degani, Sunnyvale, CA (US); Liran Liss, Atzmon (IL); Michael Dubman, Ra'anana (IL); Yossef Itigin, Hod Hasharon (IL)

(73) Assignee: Mellanox Technologies, Ltd., Yokneam (IL)

( * ) Notice: Subject to any disclaimer, the term of this patent is extended or adjusted under 35 U.S.C. 154(b) by 79 days.

(21) Appl. No.: 15/841,330

(22) Filed: Dec. 14, 2017

(65) Prior Publication Data

US 2019/0188181 A1    Jun. 20, 2019

(51) Int. Cl.
*G06F 15/16*    (2006.01)
*G06F 15/173*    (2006.01)

(52) U.S. Cl.
CPC ................ *G06F 15/17331* (2013.01)

(58) Field of Classification Search
CPC .................................................. G06F 15/17331
See application file for complete search history.

(56) References Cited

U.S. PATENT DOCUMENTS

| | | | |
|---|---|---|---|
| 6,889,266 B1 * | 5/2005 | Stadler | G06F 13/28 707/999.01 |
| 8,387,073 B1 * | 2/2013 | Micalizzi | H04L 67/1097 709/227 |
| 8,874,680 B1 * | 10/2014 | Das | H04L 67/1095 709/212 |
| 9,569,357 B1 * | 2/2017 | Shalev | G06F 11/1453 |
| 10,324,637 B1 * | 6/2019 | Cohen | G06F 3/0619 |
| 2004/0030822 A1 * | 2/2004 | Rajan | G06F 3/0605 711/4 |
| 2012/0144405 A1 | 6/2012 | Kalagananam et al. | |
| 2015/0312337 A1 * | 10/2015 | Keremane | H04L 67/1095 709/217 |
| 2016/0070652 A1 * | 3/2016 | Sundararaman | G06F 3/0619 711/154 |
| 2016/0170871 A1 * | 6/2016 | Hyun | G06F 3/0679 711/103 |
| 2017/0235702 A1 * | 8/2017 | Horie | G06F 15/17331 709/212 |
| 2017/0255590 A1 | 9/2017 | Shuler et al. | |
| 2017/0262405 A1 * | 9/2017 | Horie | G06F 15/17331 |
| 2018/0052803 A1 | 2/2018 | Graham et al. | |
| 2018/0173673 A1 * | 6/2018 | Daglis | G06F 12/0831 |

* cited by examiner

*Primary Examiner* — Hieu T Hoang

(74) *Attorney, Agent, or Firm* — Kligler & Associates

(57) ABSTRACT

Serialization and deserialization of an object are performed by transmitting metadata and addresses of data members in a byte stream through a data network, receiving the byte stream from the data network, defining a container for the object, obtaining the addresses of the data members in the first memory from the input byte stream, applying direct memory access (DMA) or remote direct memory access (RDMA) to read the data members using the obtained addresses, and writing the data members into the container to create a new instance of the object.

17 Claims, 5 Drawing Sheets

METHOD FOR ZERO-COPY OBJECT SERIALIZATION AND DESERIALIZATION

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information across a data network. More particularly, this invention relates to arrangements for serialization and deserialization of digital information that is transmitted across a data network.

2. Description of the Related Art

The meanings of certain acronyms and abbreviations used herein are given in Table 1.

TABLE 1

Acronyms and Abbreviations

| | |
|---|---|
| DMA | Direct Memory Access |
| RDMA | Remote Direct Memory Access |
| NIC | Network Interface Controller |
| UMR | User Mode Registration and Remapping |
| JNI | Java Native Interface |

Serializing and deserializing are a common technique for transferring or storing abstract objects in a computer environment. Serialization is the process where abstract objects are converted into byte sequences. These byte sequences can then be used to transfer or store objects in the form of bytes, which can later be used to reconstruct the original object so it will be identical in its function to the original object before it was serialized. Deserialization is the process where a byte sequence is converted back into an abstract object.

Serialization is a resource-intensive process. For example, in a Java environment, serialization may involve traversal of an object graph, writing the class definition of the object graph to an output stream, converting the fields of the class to a binary format, and writing the binary format to the output stream. Deserialization incurs the same overhead, and requires copying data from the byte sequence to the abstract object that is being constructed. Copying of primitive type data is a basic instrument of serialization and deserialization, but it comes at a cost. Copying data results in high-memory consumption due to the duplicate storage in memory of the data and cache pollution. It also increases the system processor usage as it imposes additional operations when building a byte sequence or reconstructing the objects.

One attempt to mitigate the overhead is proposed in U.S. Patent Application Publication No. 2012/0144405, involving serializing a mutable object utilizing a full serialization process, caching primitive data and metadata regarding the mutable object in binary format in a cache and then checking whether primitive fields of the mutable object are modified. Thereafter, the mutable object is again serialized utilizing an abbreviated serialization process by reference to the cached primitive data and metadata if the primitive fields of the object are not modified.

SUMMARY OF THE INVENTION

According to disclosed embodiments of the invention, in a network environment memory copy overhead is reduced with the aid of DMA and RDMA during serialization and deserialization in order to increase the performance of mobilizing abstract objects.

There is provided according to embodiments of the invention a method, which is carried out by storing an object that in a first memory of a computing device. The object includes metadata and data members at respective addresses in the first memory. The method is further carried out by transmitting the metadata and the addresses of the data members in the first memory in a byte stream through a data network, receiving the byte stream from the data network in another computing device as an input byte stream, defining a container for the object in a second memory of the other computing device, obtaining the addresses of the data members in the first memory from the input byte stream, applying direct memory access (DMA) or remote direct memory access (RDMA) to read the data members using the obtained addresses of the data members in the first memory, and writing the data members into the container to create a new instance of the object.

The first memory can be read using a network interface controller by mapping the respective addresses into a single memory descriptor.

According to another aspect of the method, the byte stream includes a first byte stream that transmits the metadata and a second byte stream that transmits the addresses of the data members in the first memory. The input byte stream includes a first input byte stream of the metadata and a second input byte stream of the addresses of the data members in the first memory. The addresses of the data members in the first memory are obtained from the second input byte stream.

In another aspect of the method, the other computer is operative for concurrently defining a container, and obtaining the addresses of the data members in the first memory using the second input byte stream.

According to a further aspect of the method, transmitting the metadata and the addresses of the data members includes constructing a representation of the object including locations and values of the metadata and of the data members in the byte stream.

There is further provided according to embodiments of the invention an apparatus, including a computing device having a first memory and an object stored therein, the object including metadata and data members at respective addresses in the first memory. A network interface device is linked to the computing device and is operative for transmitting the metadata and the addresses of the data members in the first memory in a byte stream through a data network. The apparatus includes another computing device having a second memory and configured for receiving the byte stream from the data network as an input byte stream, defining a container for the object in the second memory, obtaining the addresses of the data members in the first memory from the input byte stream, applying remote direct memory access (RDMA) to read the data members using the obtained addresses of the data members in the first memory, and writing the data members into the container to create a new instance of the object.

According to another aspect of the apparatus, the network interface device is operative for reading the first memory with a network interface controller by mapping the respective addresses into a single memory descriptor.

There is further provided according to embodiments of the invention a method, which is carried out by storing an object in a first memory of a computing device, the object including metadata and data members at respective addresses in the first memory. The method is further carried out by reading the first memory at the respective addresses to obtain the metadata and data members, serializing the object by transmitting the metadata and data members in a byte stream through a data network, receiving the byte stream from the data network in another computing device as an input byte stream, establishing pointers to the data members in the byte stream, defining a container for the object in a second memory of the other computing device, and populating the container to create a new instance of the object by dereferencing the data members with the pointers.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

A "container" is a representation of an object, such as a class, a data structure or an abstract data type and may be uninitialized. Containers store objects in an organized way that follow specific access rules. For example, In the case of arrays, access is done with the array index. Objects such as stacks and queues have other access rules.

Overview.

Figure 1:
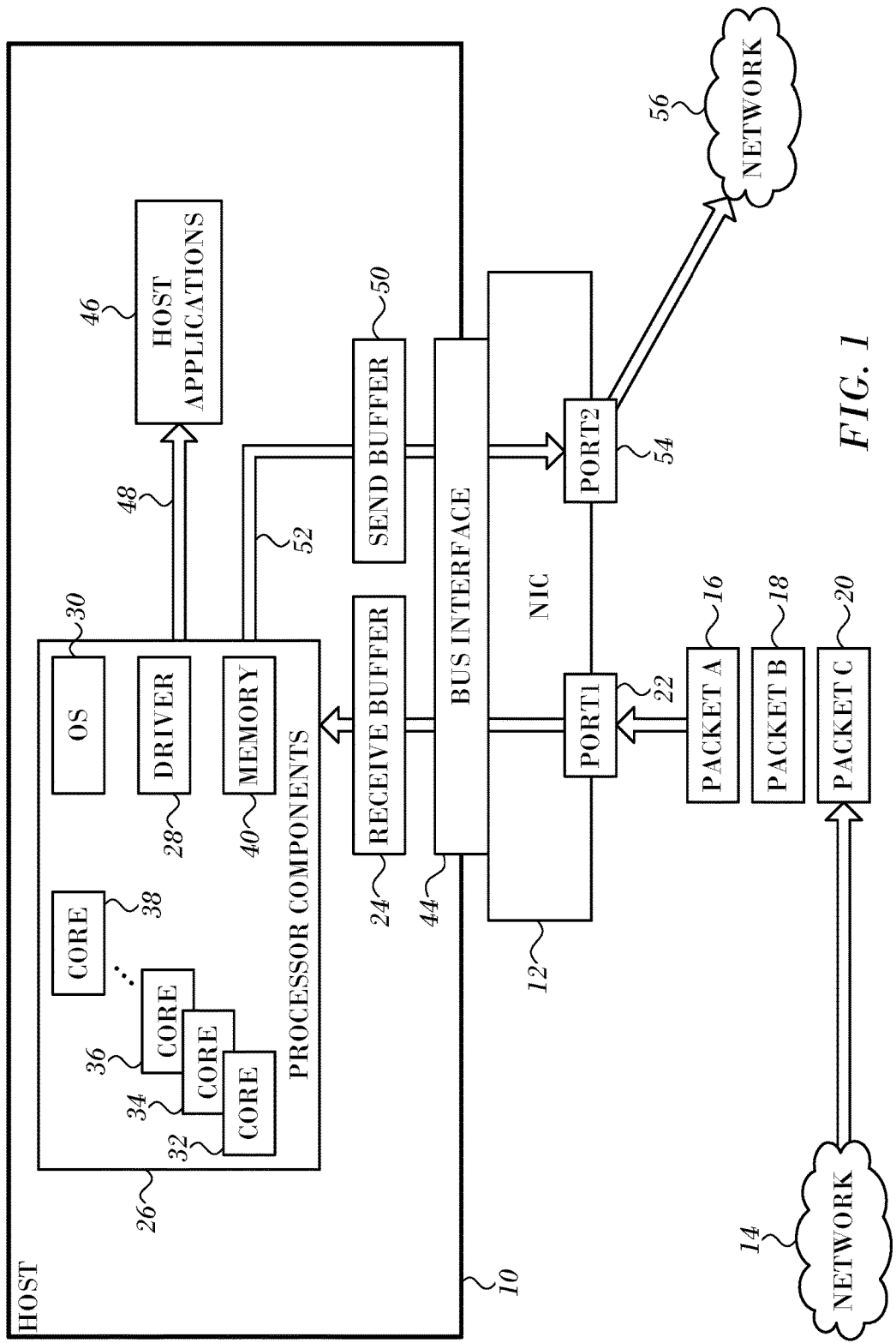
FIG. 1 schematically illustrates a network element, which is connected via a network interface to a data network in accordance with an embodiment of the invention.

Turning now to the drawings, reference is initially made to FIG. 1, which schematically illustrates a network element, host 10, which is connected via network interface 12 to a data network 14 in accordance with an embodiment of the invention. Although portions of the arrangement shown in FIG. 1 are shown as comprising a number of separate functional blocks, these blocks are not necessarily separate physical entities, but rather may represent, for example, different computing tasks or data objects stored in a memory. In practice, however, these blocks are typically (although not necessarily) implemented as hardware and firmware components within a single integrated circuit chip or chipset.

A stream of incoming data packets, here represented by packets 16, 18, 20, arrives from the network 14, entering the network interface 12 via port 22. The packets 16, 18, 20 are communicated from the network interface 12 to a packet queue in a receive buffer 24. While the receive buffer 24 is shown within the host 10, it may be implemented within the network interface 12.

Processor components 26 comprises network driver 28, operating system 30, and a plurality of cores 32, 34, 36, 38. While four cores are shown in the example of FIG. 1, any number of cores greater than one may be present. In addition a suitable memory 40 is provided for processing the packets 16, 18, 20. The principles of the invention are applicable to many multi-processor architectures other than the example of FIG. 1. Thus, the term "CPU" is sometimes used interchangeably with "core" in this disclosure. A core may be a processing element of a logical processor as well as a physical processor. Network interface 12 is connected to the system components 26 via a peripheral component bus 42, such as a PCI Express bus, through a bus interface 44.

Serialization and Deserialization.

Serialization and deserialization are general terms for the process of producing portable byte sequences out of abstract objects used in object-oriented programming, and reconstructing these objects from those sequences. Abstract objects are any non-primitive type objects, and usually consists of nested instances of further abstract objects. An example of abstract nested objects in Java syntax is shown in Listing 1.

---
Listing 1
---
```
public class O1 {
byte member1; // primitive type member
byte[ ] member2; // member array of primitive type
}
// Example of an abstract object with a nested abstract object
public class O2 {
O13; // non-primitive type member
O14; // non-primitive type member
byte member5; // primitive type member
}
```
---

In other programming languages, e.g., C++, nested members can be explicit pointers to other objects, in this case, producing a byte sequence of these objects requires "deep copying", so that instead of just copying the pointer value (address), the sequencing must present the actual data referenced by the pointer. This is required so that the reconstruction phase can rebuild the nested object that was represented by that pointer address, and not just the address value, which may be invalid on a different system or process.

Wire Protocol.

Serialization and deserialization may be implemented in multiple ways, and many specifications exist for fulfilling this task. It is inherently required that both the serialization and deserialization phase of a particular application be implemented to conform to a single specification, so that objects will be accurately reconstructed. In this document, we refer to an instance of this invariant as a "wire protocol" for serialization and deserialization. A wire protocol is formally defined in Listing 2.

For simplicity, the type "byte" is the only primitive type to be defined in the wire protocol. This protocol can easily be extended with more primitive types that consist of more than a single byte by adding more literals to the "N" group of non-terminal literals.

Furthermore, for simplification, we restrict arrays to be of type "byte" only. This restriction can be lifted easily by extending the "N" and "P" groups with suitable literals and rules. From the basic properties of regular grammar syntax, a sentence that conforms to this syntax can be interpreted to describe objects in the system. The grammar shown in Listing 2 is an example presented to facilitate understanding of the principles of the invention. Grammars of this sort can specify any serialization/deserialization specification.

Listing 2

```
G = {N, Σ, P, S}
N = {O, O₁, ... , Oₙ, Pᵣ, B, B₁, ..., B_M, B_A}
Σ = {t₁, ... , tₙ, t_b, t_{b1}, ... , t_{bM}} ∪ Σ_b
Σ_b = {'0', ... ,'255'}
S = O
P = {
  O → Pr
  O → O_i i ∈ 1, ... , n}
    P_r → B
    P_r → B_A
  B_A → B_i i ∈ {1, ... , M}
  B → t_b X  X ∈ Σ_b
  B_i → t_{bi} X₁ ... X_i X₁, ... , X_i ∈ Σ_b
}
```

M is the maximum array length allowed in the system.

n is the number of objects defined in the system.

"$O_i \rightarrow$" rules will be defined per system, according to the objects defined in the system.

In Listing 3 an extension of the wire protocol accommodates the objects of Listing 1.

Listing 3

A rule for constructing object "O1":
$O_2 \rightarrow O_1 O_1 B$.

In order to demonstrate an application implementing the wire protocol, we define a byte representation for the terminating literals (Σ). For further simplification, we define the byte representation for the literals as strings. The strings can be then translated into byte sequences with the provided mapping. We restrict the byte representation to four bytes for compactness, but that can be extended as needed.

Table 2 illustrates string and byte representations for terminating literals defined in the formal wire protocol.

TABLE 2

| Terminating literal | String representation | Byte representation (4 bytes) |
|---|---|---|
| $t_i$ | "<object_type_i>" | 0x01<I>, where I is the hexadecimal representation for i |
| $t_b$ | "<byte>" | 0x00000000 |
| $t_{bi}$ | "<byte_array_len_i>" | 0x00<L>, where L is the hexadecimal representation for i |

Byte Wire Protocol Usage Example.

Listing 4 is an example that illustrates output of objects defined in Listing 1 using the wire protocol of Listing 2.

Listing 4

```
byte[ ] arr1 = {2,4,6};
byte[ ] arr2 = {21,45,60,100};
O1 varO1a = new O1(5, arr1);
O1 varO1b = new O1(19, arr2);
O2 varO2 = new O2(varO1a, varO1b, 121);
/*
```

The output for serializing varO2 with the byte wire protocol will then be:

Simplified string:
<object_type_2>                      <object_type_1>
<byte>0x05<byte_array_len_3>0x02                 0x04
0x06<object_type_1> <byte>0x13<byte_array_len_4>0x15
0x2D 0x3C 0x64 <byte>0x79

Byte sequence:
0x01000002 0x01000001 0x00000000 0x05 0x00000003 0x02 0x04 0x06 0x01000001 0x00000000 0x13 0x00000004 0x15 0x2D 0x3C 0x64 0x00000000 0x79

And as one continuous hexadecimal byte representation:
010000020100000100000000050000000302040601000001000000001300000004152 D3C64 0000000079
*/

Avoiding Memory Copy.

Existing methods for serialization construct byte sequences that conform to wire protocols similar to the one defined above, and as previously noted, require data to be copied from the original object to the new byte sequence, so that the sequence would have contiguous representation in memory. For example, in Listing 4, the bytes in the byte array "arr1" (2, 4, 6) were copied to the output byte sequence. Later, when the object is to be reconstructed from this byte sequence, the data would have to be copied again from the byte sequence to a new byte array that would be allocated as part of the new object constructor.

DMA and RDMA can be used for obtaining contiguous data in memory. In the example of Listing 4, an alternative for representing primitive typed data into an output byte sequence, such as the array arr1 (2, 4, 6), references the relevant portion of the memory sequence rather than copying it.

Consider a portion of the contiguous hexadecimal representation that includes the object varO1a in Listing 4:
0x010000010000000005000000003020406.

The serialized sequence of bytes can be described by a single address in memory that references an entire contiguous byte sequence, as shown in Table 3, in which all the values can be individually obtained using appropriate offsets from a base address, or the entire 16 byte sequence obtained by reading 16 bytes from address 0x00000000.

TABLE 3

| Address | Value |
| --- | --- |
| 0x00000000 | 0x01 00 00 01 |
| 0x00000004 | 0x00 00 00 00 |
| 0x00000008 | 0x05 00 00 00 |
| 0x0000000C | 0x03 02 04 06 |

Alternatively, in a multi-address representation shown in Table 4, the byte sequence can be described by a series of memory locations.

TABLE 4

| Address | Value |
| --- | --- |
| 0x00000000 | 0x01 00 00 01 |
| 0x00000004 | 0x00 00 00 00 |
| 0x00001000 | 0x05 00 00 00 |
| 0x00000008 | 0x00 00 00 03 |
| 0x00002004 | 0x02 04 06 00 |

When these memory locations are referenced sequentially, the output will be identical to the current method, conforming to the wire protocol. A series of reads is performed as follows:

1. Read 8 bytes from address 0x00000000.
2. Read 1 byte from address 0x00001000.
3. Read 4 bytes from address 0x00000008.
4. Read 3 bytes from address 0x00002004.

Reversing the process, deserialization can avoid memory copy when reconstructing objects from a byte sequence. When reconstructing an object, the actual memory address of the primitive data is referenced and the object reused, instead of allocating new memory and copying the data to it.

DMA and RDMA Accelerated Serialization.

The methods described in the previous section can be extended to employ Direct Memory Access (DMA) and Remote Direct Memory Access (RDMA) for producing contiguous byte sequence with a series of addresses to avoid memory copy of primitive typed data. These techniques are effective for transporting abstract objects, as described below.

RDMA is a direct memory access from the memory of one computer into that of another computer without involving the operating system of either one. Common RDMA implementations include RDMA over converged Ethernet (RoCE), InfiniBand and iWARP. One suitable method of accessing objects using RDMA is disclosed in U.S. Patent Application Publication No. 20170255590, entitled Atomic Access to Object Pool over RDMA Transport Network, which is herein incorporated by reference. RDMA access is supported by modern NICs, which possess useful gather-scatter capabilities, as described, for example, in copending application Ser. No. 15/681,390, which is herein incorporated by reference.

NICs may use memory address for obtaining data to be transmitted over a data network. It is possible to transmit a contiguous byte sequence by providing the memory address of the sequence to the NIC, which then fetches the sequence from the system memory, and transmits it to the desired destination.

First Embodiment

Figure 2:
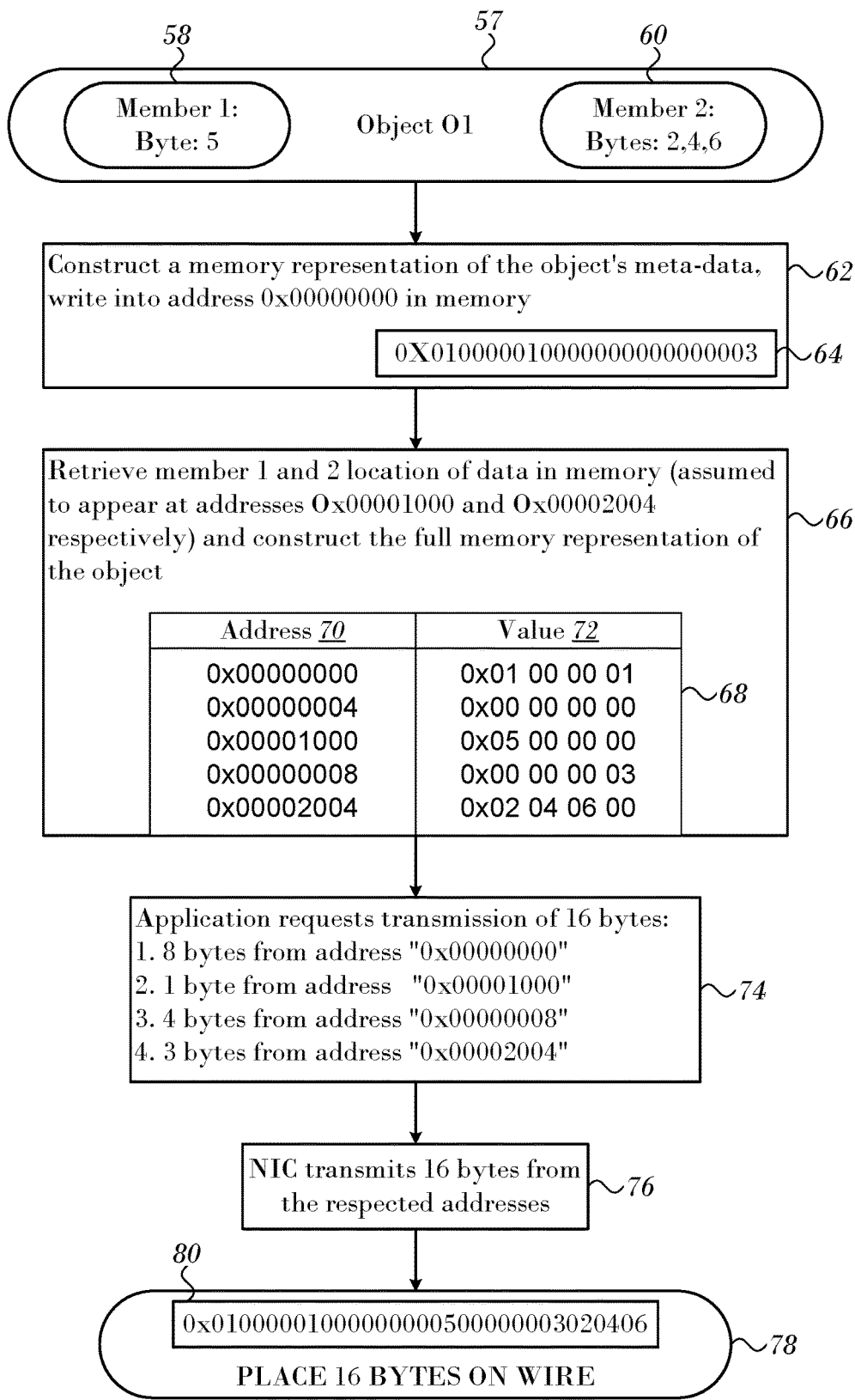
FIG. 2 illustrates a method of serializing an object according to an embodiment of the invention.

Reference is now made to FIG. 2, which illustrates a method of serializing an object according to an embodiment of the invention. An object 57 may comprise any number of members, represented as members 58, 60. Member 58 comprises a single byte. Member 60 is an array of three bytes. The size of the object 57 is minimized for simplicity of presentation. Objects may comprise any number of members, including nested members and may have any number of bytes distributed among the members. The advantages of the method compared to simply copying the object to a new memory location become increasingly apparent as the size and number of the members increase.

A representation of the object's metadata is constructed in step 62 and is written into a send buffer 64, which in this example begins at address 0x00000000. Send buffer 64 also includes pointers to the original source data of the object 57, which may be located in different areas of memory. Using appropriate DMA procedures, in step 66 a full representation of the object 57 is constructed, which includes the locations of the data and the data itself. Table 68, having an address column 70 and a value column 72 is an exemplary representation. The first two rows and the fourth row comprise metadata copied into send buffer 64.

It will be apparent from inspection of the address column 70 that the members of the object 57 are not contiguous. Assume that an application requests the object 57. Table 68 is built by a series of read operations to obtain the actual data and combined with metadata that is generated in order to describe the object 57. Metadata is inserted at address 0x00000000, occupying the first two rows of the table. To obtain the data of member 58 one byte is read from address 0x00001000. Four bytes beginning at address 0x00000008 are metadata that are generated to describe the member 60. The first byte, 0x00, indicates that member 60 is a byte array. The remaining three bytes, 00 00 03 indicate that there are three bytes in the array. Three bytes constituting member 60 are read from address 0x00002004, forming the bottom row of the table.

Upon request in step 74 by an application for the object 57, in step 76 the NIC of the host transmits 16 bytes from the respective addresses. In final step 78 16 bytes appear on the wire, as shown in block 80 As a result once the size of the source data exceeds the size of the address pointers, fewer memory accesses are required to populate the buffer 64 compared to conventional serialization. Avoiding data copying into the buffer 64 not only reduces the number of memory operations required for the serialization but also reduces the size of the buffer 64.

The process described in FIG. 2 may be exploited in the receiver of the data to avoid memory copy during deserialization. It will be recalled that conventionally, after receiving a sequence of bytes, the deserializer creates a corresponding container to hold the new object according to the information carried by the metadata in the stream (object identifiers). This container is then populated by copying primitive typed data from the sequence to the new object.

Figure 3:
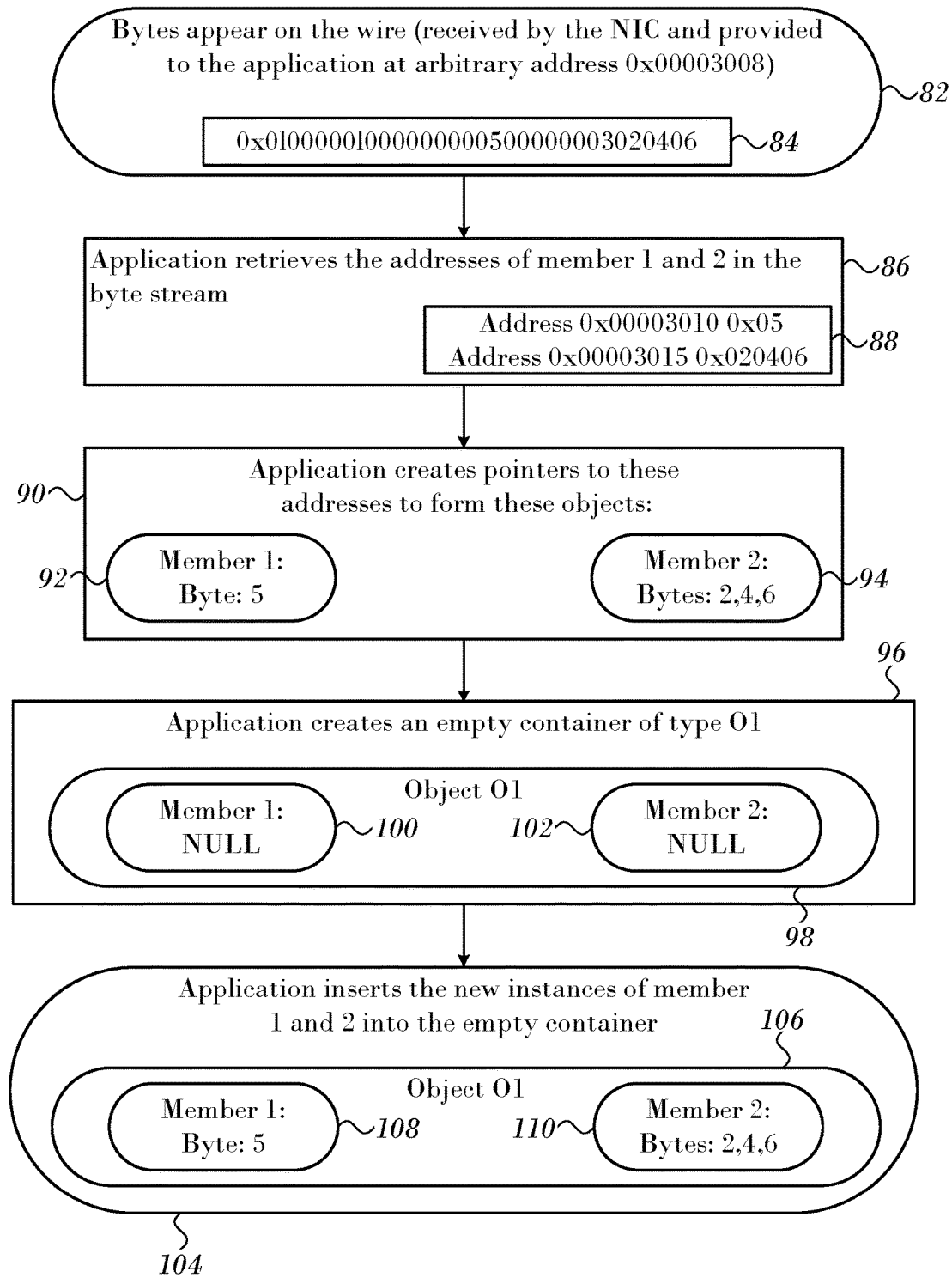
FIG. 3 illustrates a method of deserializing an object according to an embodiment of the invention.

In this embodiment the container is populated with primitive typed data by an optimized method. Instead of copying data from the sequence of bytes into a buffer, the deserializer creates a reference to the data in the sequence, e.g., in the form of a memory pointer. Reference is now made to FIG. 3, which illustrates a method of deserializing an object in accordance with an embodiment of the invention.

At initial step 82 bytes representing the object 57 (FIG. 2) appear on the wire and are received by the NIC of the receiver in a byte stream 84.

In step 86 the requesting application retrieves the addresses in the byte stream 84 that correspond to the data of the members 58, 60 as shown in block 88. In this example, the byte stream 84 begins at address 0x00003008. The address of the data of member 58 (a single byte having value 0x05) in the byte stream 84 is 0x00003010. The address of the data of member 60 (a 3 byte array, value 0x020406) in the byte stream 84 is 0x00003015.

Next, at step 90 the Application generates pointers to the addresses in the byte stream 84 shown in block 88, and, using the metadata in the byte stream 84, defines objects 92, 94, which correspond to the members 58, 60, respectively.

Next, at step 96 an empty container 98 conforming to object 57 (FIG. 2) is created by the requesting application. Empty containers 100, 102 are allocated to receive the pointers created in step 90 that defined objects 92, 94, respectively.

Next, at final step 104 the pointers assigned to the empty containers 100, 102 are replaced by pointers to objects 92, 94 to populate the empty containers and to form members 108, 110 and a new instance of the object 57 (FIG. 2). The new instance is illustrated in FIG. 3 as object 106.

It should be noted that the method of FIG. 3 may not be available when there are system limitations in referencing data in the received byte sequence. Moreover, referencing the data in the original sequence may require maintaining the entire received byte sequence in memory, not just the particular segments of interest. This requirement may strain the availability of system memory, due to large portions being underutilized, as they are not referenced by any active object, e.g., metadata in the original byte sequence.

Second Embodiment

A modification of the method of FIG. 3 according to embodiments of the invention improves memory utilization, and is explained with reference to object 57 (FIG. 2) and its multi-address representation in Table 4. Members 58, 60 reside in the same memory addresses:

Member 58: 1 byte in address 0x00001000.
Member 60: 3 bytes in address 0x00002004.

Figure 4:
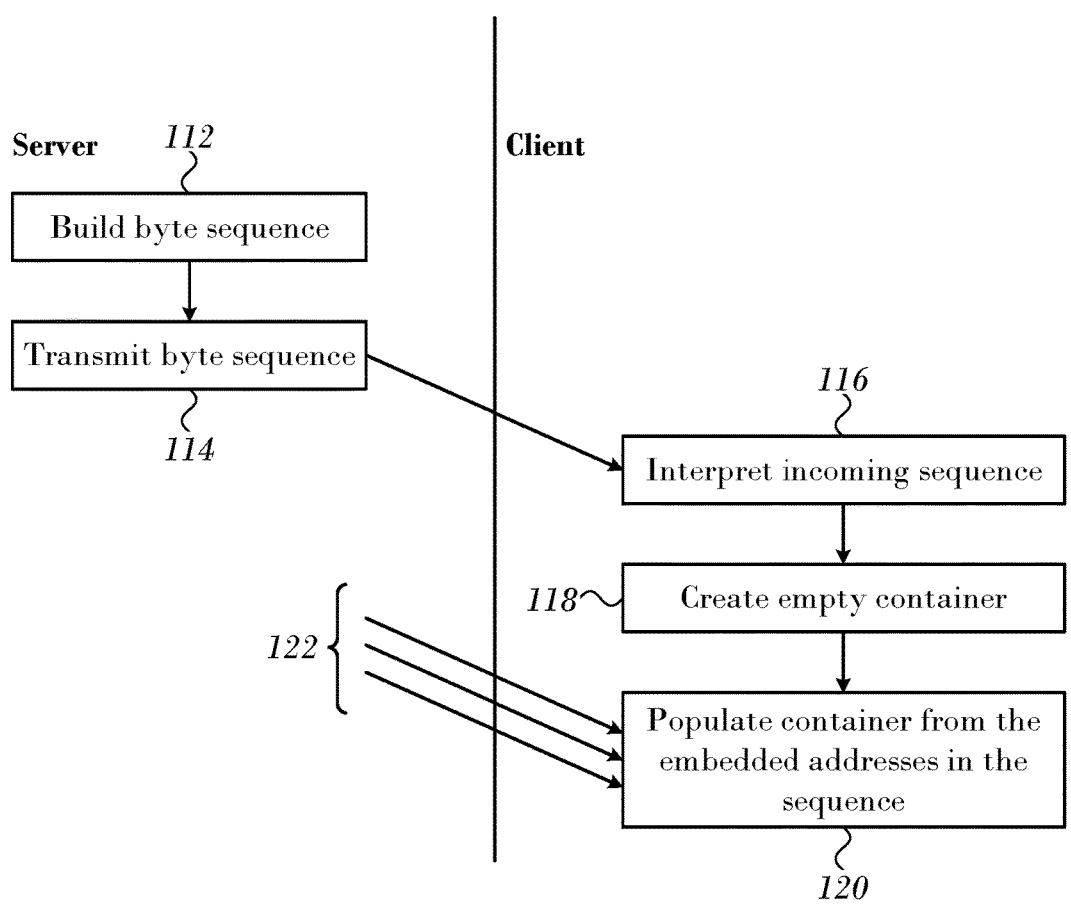
FIG. 4 is a diagram illustrating a method of serialization and deserialization of data in accordance with an alternate embodiment of the invention.

Reference is now made to FIG. 4, which is a diagram illustrating a method of serialization and deserialization of data in accordance with an embodiment of the invention. Server-side activities include building a byte sequence in block 112 and transmitting the sequence in block 114. The byte sequence differs from the sequence in block 84 (FIG. 3).

In Table 5 the byte sequence of members 58, 60 that appears in block 84 (also shown in Listing 4) is compared with the sequence produced by the modification of FIG. 3. In summary, in order to improve memory utilization, the modification involves three changes:

(1) Primitive typed data ($\Sigma_b$ literals) are omitted from the byte sequence.

(2) The omitted data is replaced in the byte sequence by a reference to the original data in memory, e.g., by a memory address.

(3) When the byte sequence is interpreted by the deserializer, the addresses of the primitive typed data are obtained from the byte sequence. The actual primitive typed data is obtained by reading the primitive typed data at their original locations at the addresses obtained from the byte sequence. Referencing the data by memory address may not be sufficient for some implementation. For example, RDMA requires a memory key as well. In this case the wire protocol will be extended to include the memory address as well as the memory key. For simplicity details concerning the memory key are omitted in this disclosure.

TABLE 5

| | |
|---|---|
| Method of FIG. 3 | 0x010000010000000005000000003020406 |
| Modified Method | 0x0100000100000000000100000000000300002004 |

The underlined portions in the top row consist of the primitive data of the members 58, 60. In the bottom row the underlined portions are the memory addresses that contain the primitive data. The underlined addresses replace the corresponding primitive data.

Deserialization is performed in the client in by interpreting the incoming byte sequence in block 116 and creating an empty container in block 118. The process indicated by blocks 116, 118, is performed as in FIG. 2, mutatis mutandis. Population of the empty container is performed in block 120. Rather, the addresses obtained from the sequence in the lower column of Table 5 are used to reference the primitive typed data, using DMA and RDMA as appropriate and to thereby place the primitive typed data into the empty container (indicated in FIG. 4 by arrows 122) without copying the primitive typed data into an intermediate buffer. Accessing the primitive typed data in this manner obviates the need to maintain the entire incoming byte sequence in the client's memory.

In this particular example, since the primitive data is small in size, the memory addresses occupy more space than the actual data. But in less simplified cases, different types and array sizes may be represented by a much larger number of bytes in the sequence. The storage required for the addresses is independent of the data storage requirements, and the byte sequence length is reduced significantly compared to the original wire protocol.

Third Embodiment

In the grammar shown in Listing 2, both the metadata (object descriptors) and data (actual bytes) are written continuously and interchangeably to the same buffer. Separating the output byte stream of the server into two independent byte streams produces further optimizations in the inventive methods. One byte stream holds the metadata, while the other holds actual data. The deserializer is adapted to process the two byte streams.

This embodiment applies the twin buffer approach to serialization using accelerated serialization without memory copy as described above with respect to FIG. 4. The multi-address representation of object 57 in Table 4 is now described by Table 6 and Table 7, holding the metadata and actual data, respectively. Each table represents a separate contiguous memory buffer or byte stream, and each has significantly fewer addresses than the combined representation in Table 4. Processing both tables in parallel using the above-described embodiments can improve overall performance. Additionally or alternatively the two streams can be combined into a single stream for transmission: metadata followed by actual data. The size of the meta-data will be known to the receiver. Advantageously, the receiver can then scatter the metadata and actual data into different buffers, using a single stream.

TABLE 6

| (metadata) | |
|---|---|
| Address | Value |
| 0x00000000 | 0x01 00 00 01 |
| 0x00000004 | 0x00 00 00 00 |
| 0x00000008 | 0x00 00 00 03 |

TABLE 7

| (data) | |
| --- | --- |
| Address | Value |
| 0x00001000 | 0x05 00 00 00 |
| 0x00002004 | 0x02 04 06 00 |

The twin buffer approach offers advantages in deserialization. In the method described with respect to FIG. 4 multiple DMA or RDMA reads are required to populate the empty container in block 120. Using the twin buffer approach, it is possible to reduce the number of read operations to a single read. Instead of populating empty containers one after the other as in step 90 (FIG. 3), it is possible to populate all of them at once. Thus, while traversing the meta data buffer, the deserializer can create the empty containers, record their addresses and build a destination address list similar to the one shown in Table 4. When the meta-data buffer has been fully processed, the deserializer has a list of addresses, that if populated using the second buffer of the actual data, the resulting objects will be identical to the source. The efficiency of deserialization has been improved by reducing the amount of read operations.

Implementation in Java and Similar Environments.

Java and other runtime environments create a layer of abstraction between the physical memory in the machine and objects that are accessible by applications. In particularly, native Java code does not expose memory addresses. Even so, in Java, and in other environments, special facilities allow direct access to the physical memory addresses. This is essential for these environments to be able to interact with various I/O devices. The special facilities can be utilized to implement the methods discussed above, even in environments that do not allow unrestricted access to memory addresses. For example, the memory addresses of byte arrays can be exposed in Java by calling the function GetByteArrayElements( ) in the Java Native Interface (JNI). These addresses can then be used for transmitting the arrays as using any of the embodiments described above.

EXAMPLES

A prototype implementation of the methods described in the previous embodiments was used to assess performance improvements. The prototype was implemented in Java and C++, using RDMA and tested on two machines. The prototype was used to evaluate conventional serialization and deserialization with the above-described embodiments. Rate measurements (bytes/sec) were taken during the serialization process for byte arrays of different sizes.

Figure 5:
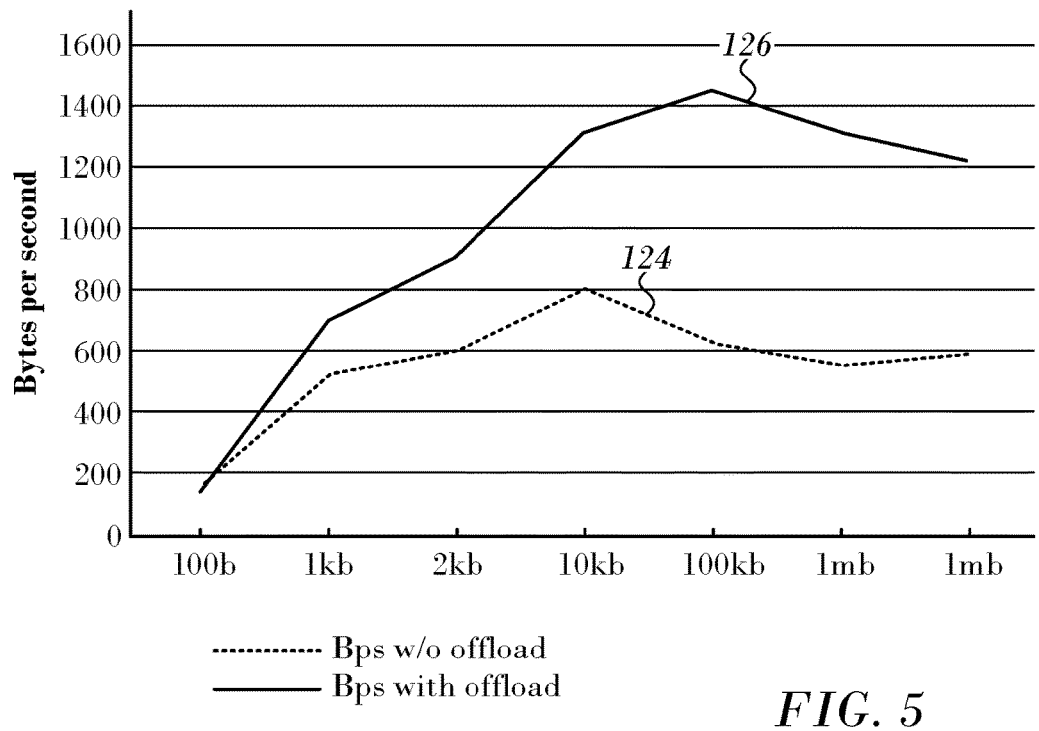
FIG. 5 is a set of plots showing byte rates obtained in an embodiment of the invention.

In FIG. 5 plots 124, 126 show byte rates using conventional serialization and serialization, respectively, by the method of FIG. 3. The inventive method has an advantage at all byte rates, particularly in the range of 10-100 kBps.

Figure 6:
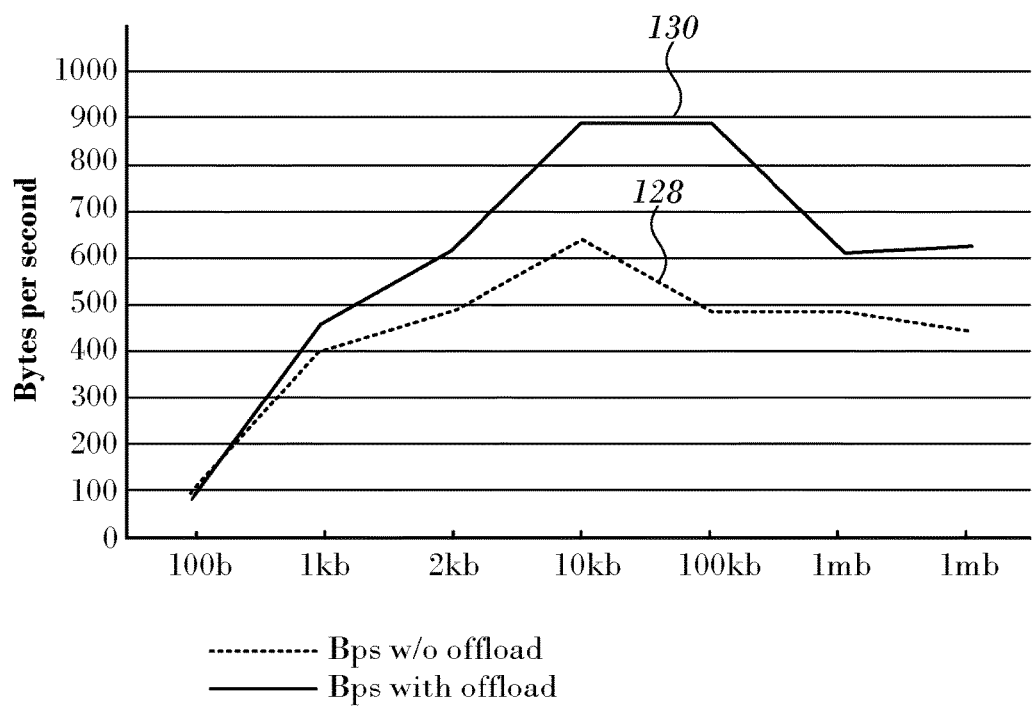
FIG. 6 is a set of plots showing byte rates obtained in an alternate embodiment of the invention.

In FIG. 6, plots 128, 130 show byte rates using conventional serialization and serialization, respectively by the method of FIG. 4. The inventive method again has an advantage beginning at low byte rates. Above 10 kBps byte rate for the conventional method declines, while the byte rate obtained by the inventive method remains maximal until 100 kBps. A maximum advantage of the inventive method occurs at about 100 kBps.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
    storing an object that in a first memory of a computing device, the object comprising metadata and data members at respective addresses in the first memory;
    transmitting the metadata and the addresses of the data members in the first memory in a byte stream through a data network;
    receiving the byte stream from the data network in another computing device as an input byte stream;
    defining a container for the object in a second memory of the other computing device;
    obtaining the addresses of the data members in the first memory from the input byte stream;
    applying direct memory access (DMA) or remote direct memory access (RDMA) to read the data members using the obtained addresses of the data members in the first memory; and
    writing the data members into the container to create a new instance of the object.

2. The method according to claim 1, wherein the byte stream comprises a first byte stream that transmits the metadata and a second byte stream that transmits the addresses of the data members in the first memory, and the input byte stream comprises a first input byte stream of the metadata and a second input byte stream of the data members in the first memory, further comprising obtaining the addresses of the data members in the first memory from the second input byte stream.

3. The method according to claim 2, further comprising combining the first byte stream and the second byte stream into a single byte stream, wherein the metadata precedes the data members.

4. The method according to claim 2, further comprising concurrently performing the steps of:
    defining a container; and
    obtaining the addresses of the data members in the first memory using the second input byte stream.

5. The method according to claim 1, wherein transmitting the metadata and the addresses of the data members comprises constructing a representation of the object comprising locations and values of the metadata and of the data members in the byte stream.

6. An apparatus, comprising:
    a computing device having a first memory and an object stored therein, the object comprising metadata and data members at respective addresses in the first memory;
    a network interface device linked to the computing device and operative for transmitting the metadata and the addresses of the data members in the first memory in a byte stream through a data network; and
    another computing device having a second memory and configured for:
    receiving the byte stream from the data network as an input byte stream;
    defining a container for the object in the second memory;
    obtaining the addresses of the data members in the first memory from the input byte stream;
    applying remote direct memory access (RDMA) to read the data members using the obtained addresses of the data members in the first memory; and
    writing the data members into the container to create a new instance of the object.

7. The apparatus according to claim 6, wherein the network interface device is operative for reading the first memory with a network interface controller by mapping the respective addresses into a single memory descriptor.

8. The apparatus according to claim 6, wherein the byte stream comprises a first byte stream that transmits the metadata and a second byte stream that transmits the addresses of the data members in the first memory, and the input byte stream comprises a first input byte stream of the metadata and a second input byte stream of the addresses of the data members in the first memory, and the addresses of the data members in the first memory are obtained from the second input byte stream.

9. The apparatus according to claim 8, wherein the network interface device is operative for combining the first byte stream and the second byte stream into a single byte stream, wherein the metadata precedes the data members.

10. The apparatus according to claim 8, wherein the other computer is operative for concurrently defining a container; and obtaining the addresses of the data members in the first memory using the second input byte stream.

11. The apparatus according to claim 6, wherein transmitting the metadata and the addresses of the data members comprises constructing a representation of the object comprising locations and values of the metadata and of the data members in the byte stream.

12. A method, comprising the steps of:
storing an object in a first memory of a computing device, the object comprising metadata and data members at respective addresses in the first memory;
reading the first memory at the respective addresses to obtain the metadata and data members;
serializing the object by transmitting the metadata and data members in a byte stream through a data network;
receiving the byte stream from the data network in another computing device as an input byte stream;
establishing pointers to the data members in the byte stream;
defining a container for the object in a second memory of the other computing device; and
populating the container to create a new instance of the object by dereferencing the data members with the pointers.

13. The method according to claim 12, where reading the first memory is performed in a network interface controller by mapping the respective addresses into a single memory descriptor.

14. The method according to claim 12, wherein the byte stream comprises a first byte stream that transmits the metadata and a second byte stream that transmits the data members, and the input byte stream comprises a first input byte stream of the metadata and a second input byte stream of the data members, and the step of establishing pointers is performed with respect to the second input byte stream.

15. The method according to claim 14, further comprising combining the first byte stream and the second byte stream into a single byte stream, wherein the metadata precedes the data members.

16. The method according to claim 14, further comprising concurrently performing the steps of:
defining a container; and
establishing pointers and dereferencing the data members using the second input byte stream.

17. The method according to claim 12, wherein serializing comprises constructing a representation of the object comprising locations and values of the metadata and of the data members in the byte stream.

* * * * *